(12) United States Patent
Heemstra

(10) Patent No.: US 10,867,490 B2
(45) Date of Patent: Dec. 15, 2020

(54) OBJECT FOR THEFT DETECTION

(71) Applicant: SIGNIFY HOLDING B.V., Eindhoven (NL)

(72) Inventor: Tewe Hiepke Heemstra, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/466,753

(22) PCT Filed: Nov. 30, 2017

(86) PCT No.: PCT/EP2017/080995
§ 371 (c)(1),
(2) Date: Jun. 5, 2019

(87) PCT Pub. No.: WO2018/104144
PCT Pub. Date: Jun. 14, 2018

(65) Prior Publication Data
US 2019/0347913 A1    Nov. 14, 2019

(30) Foreign Application Priority Data

Dec. 5, 2016  (EP) .................................. 16202114

(51) Int. Cl.
| G08B 13/14 | (2006.01) |
| B60R 25/102 | (2013.01) |
| B60R 25/104 | (2013.01) |
| B60R 25/30 | (2013.01) |

(52) U.S. Cl.
CPC ........ *G08B 13/1427* (2013.01); *B60R 25/102* (2013.01); *B60R 25/104* (2013.01); *B60R 25/305* (2013.01)

(58) Field of Classification Search
None
See application file for complete search history.

(56) References Cited

U.S. PATENT DOCUMENTS

| 7,075,433 B2 | 7/2006 | Singer |
| 8,442,785 B2 | 5/2013 | Walters et al. |
| (Continued) | | |

FOREIGN PATENT DOCUMENTS

| GB | 2402840 A | * 12/2004 | ........... B60R 25/209 |
| GB | 2402840 A | 12/2004 | |

*Primary Examiner* — Fekadeselassie Girma
(74) *Attorney, Agent, or Firm* — Meenakshy Chakravorty

(57) ABSTRACT

The invention provides a first object (100) for theft detection of a second object (200), the second object (200) being in pair with a third object (300) for securing the second object (200), the first object (100) comprising: a detector (101) for detecting a second signal (201) of the second object (200) and a third signal (301) of the third object (300) when transmitted within a detection area (103) of the detector (101), and providing a detector output (104); a controller (102) for identifying, by processing the detector output (104), a condition (105) indicating both (i) a pairing of the second signal (201) and the third signal (301), and (ii) the second signal (201) moving out of the detection area (103) while the third signal (301) is not being detected within the detection area (103), and performing a theft detection action (106) when the condition (105) is identified.

15 Claims, 4 Drawing Sheets

(56) References Cited

U.S. PATENT DOCUMENTS

| | | | | |
|---|---|---|---|---|
| 8,841,987 B1* | 9/2014 | Stanfield | ............ | G07C 9/00896 |
| | | | | 340/5.61 |
| 10,145,516 B2* | 12/2018 | Thiel | ............ | F21K 9/278 |
| 10,157,523 B2* | 12/2018 | McAllister | ............ | G08B 17/10 |
| 10,247,406 B2* | 4/2019 | Abbott | ............ | F21V 33/00 |
| 2006/0132294 A1* | 6/2006 | Spark | ............ | G08B 13/19647 |
| | | | | 340/426.1 |
| 2010/0171642 A1* | 7/2010 | Hassan | ............ | G01S 13/825 |
| | | | | 340/992 |
| 2013/0196612 A1* | 8/2013 | Cepuran | ............ | G08B 21/025 |
| | | | | 455/404.1 |
| 2013/0271273 A1* | 10/2013 | Oesterling | ............ | G07C 9/00309 |
| | | | | 340/426.18 |
| 2014/0253733 A1* | 9/2014 | Norem | ............ | G08G 1/017 |
| | | | | 348/159 |
| 2015/0046074 A1* | 2/2015 | Challapali | ............ | G08G 1/01 |
| | | | | 701/117 |
| 2015/0179033 A1* | 6/2015 | Birk | ............ | H04W 4/021 |
| | | | | 340/572.1 |
| 2015/0352947 A1* | 12/2015 | Hubschman | ............ | B60K 15/0406 |
| | | | | 340/450.2 |
| 2016/0075272 A1* | 3/2016 | Cermak | ............ | B60Q 1/00 |
| | | | | 340/426.15 |
| 2016/0098878 A1* | 4/2016 | Cabouli | ............ | G06F 21/86 |
| | | | | 340/5.52 |
| 2016/0180721 A1* | 6/2016 | Otulic | ............ | B60Q 9/00 |
| | | | | 701/2 |
| 2017/0099295 A1* | 4/2017 | Ricci | ............ | A61B 5/0077 |
| 2017/0313262 A1* | 11/2017 | Wisnia | ............ | H04N 7/183 |
| 2018/0091930 A1* | 3/2018 | Jefferies | ............ | G07C 9/00896 |
| 2019/0023223 A1* | 1/2019 | Yoo | ............ | B60R 21/0134 |
| 2020/0120509 A1* | 4/2020 | Stitt | ............ | H04W 12/1208 |
| 2020/0219343 A1* | 7/2020 | Stitt | ............ | H04L 47/283 |
| 2020/0219344 A1* | 7/2020 | Stitt | ............ | H01Q 1/3291 |

* cited by examiner

OBJECT FOR THEFT DETECTION

CROSS-REFERENCE TO PRIOR APPLICATIONS

This application is the U.S. National Phase application under 35 U.S.C. § 371 of International Application No. PCT/EP2017/080995, filed on Nov. 30, 2017, which claims the benefit of European Patent Application No. 16202114.1, filed on Dec. 5, 2016. These applications are hereby incorporated by reference herein.

FIELD OF THE INVENTION

The invention relates to a first object for theft detection of a second object, the second object being in pair with a third object for securing the second object, the first object comprising a detector and a controller. The invention further relates to a system for theft detection of a second object, the second object being in pair with a third object for securing the second object, the system comprising a first, second and third object. The invention moreover relates to a method performed by a first object for theft detection of a second object, the second object being in pair with a third object for securing the second object; and relates to a computer program product.

BACKGROUND OF THE INVENTION

Such an object is known from U.S. Pat. No. 8,442,785B2, in which a light management system is disclosed having networked intelligent luminaire managers. An intelligent luminaire manager is able to communicate with radio frequency (RF) or radio frequency identification (RFID) type devices.

It is further disclosed that: whenever a car's engine is started without using the car's ignition key, an RF device included in the car may be configured to start transmitting a stolen car signal. Such a stolen car signal would be detected by an intelligent luminaire manager and reported via the network formed by intelligent luminaire managers.

Thus, using said network, the location of stolen cars may be monitored and located. Such a system is nevertheless still limited in theft detection, because the notion of theft only depends on starting the car without ignition key. Using a stolen key, a duplicate key, or steal the car entirely without starting will still render possible routes for theft.

SUMMARY OF THE INVENTION

It is an object of the invention to provide an improved (first) object for theft detection, which is able to detect theft of a second object, which is in pair with a third object. Thereto, the invention provides a first object for theft detection of a second object, the second object being in pair with a third object for securing the second object, the first object comprising:

a detector for detecting a second signal of the second object and a third signal of the third object when transmitted within a detection area of the detector, and providing a detector output;

a controller for identifying, by processing the detector output, a condition indicating both (i) a pairing of the second signal and the third signal, and (ii) the second signal moving out of the detection area while the third signal is not being detected within the detection area, and performing a theft detection action when the condition is identified.

A second object may be pair-able with a third object for securing the second object (from 'theft'). Such a pairing indicates that the second object and the third object belong together. Belonging together may be legally and/or physically. For example: a car may belong to a user wearable device owned by a user which is legally owning the car; an electronics device may belong to another electronics device; a key may belong to a lock; or a mobile phone may belong to a car, etc.

Theft may then be specified as a condition when both: the second object and the third object are recognized as a pair within an area, and when the second object is moving out of that area while the third object is not being detected within that area. Theft is thus a condition in which two objects in pair, which belong together within an area, the one securing the other, are physically separated after being recognized as belonging together. Hence, to detect such a theft, the invention provides a first object for theft detection, which comprises a detector for detecting a second signal of the second object and a third signal of the third object when transmitted within a detection area of the detector. The detector may be able to monitor the second signal of the second object and the third signal of the third object, such that said condition for theft is able to be identified by processing the detector output. Theft may for example be a car of an owner stolen by a thief; or for example a 'child' of a 'mother' being lost (by own means) after being left to stay at a location. Furthermore, not detecting the third signal of the third object may also imply not detecting a dedicated (or active) signal of the third object for theft detection, while an third object may still transmit a generic (or passive) third signal.

The first object may detect theft of a second object, which is in pair with a third object; the second object and third object belonging together, the third object securing the second object. An advantage of such a theft detection architecture is that theft of a second object is detectable by an autonomous (independent) first object. Theft detection of the second object does therefore not require the second object to assess and report itself that it has been stolen. This is advantageous, because a stolen second object may become unreliable in reporting its own theft after it has been stolen and possibly breached.

Another advantage is that the first object is able to unobtrusively detect said theft and perform a theft detection action immediately after the theft has occurred and identified. Hence, the first object for theft detection provides active theft detection, because the condition for theft is continuously and unobtrusively assessed, without the first and second object being obtruded by any security measures.

The third object may be securing the second object by being an authorization for locking or unlocking the second object. Theft of the second object may comprise breaching said authorization, however, theft may also comprise moving (stealing) the second object entirely when not physically locked to a location. (For example, stealing a car by towing it away, instead of breaching the key by tampering with the ignition). In such conditions, only locking the second object will not render an effective security. Consequently, the first object of the invention provides an advantage, because the theft of the second object is identified by detecting whether the second signal is moving out of the detection area while the third signal is not being detected within the detection area.

The first object, according to the invention, is therefore autonomously and unobtrusively locking the second object, which is in pair with the third object, to a detection area of the detector comprised by the first object. This provides an improved and advantageous first object for theft detection. More specifically: The first object may lock or secure the second object (being in pair with the third object belonging together) automatically to the area of its detector when identified as a pair.

The second signal of the second object and the third signal of the third object are both a signal detectable by the detector. Such a signal may either be transmitted wirelessly, or conversely merely comprise an indicative signal. Moreover, such a signal may also be a dedicated signal for the purpose of theft detection, or conversely be a signal not initially dedicated for theft detection. Said signals may be continuous signals, but also periodic signals. More specifically:

The signal may be transmitted wirelessly from a beacon(s) comprised by the object. Said signal may be selected from the group of a Wi-Fi signal, a Bluetooth signal, ZigBee, Radio Frequency (RF), Infrared (IR), Long Range Low Power (LoRa), another standard in the ISM band, Near Field Communication (NFC), audio signal, or Visible Light Communication (VLC) signal; or any combination thereof. The object may thus emit multiple signals, or multiple different signals.

Furthermore, the signal may also be an indicative signal, which is not transmittable wirelessly, but still detectable by the detector. Said signal may for example be a thermal footprint of an object, or a coded thermal footprint of an object. The (coded) thermal footprint may then be detectable with a camera, thermal image detector, or PIR sensor. Another indicative signal may be a visual property of an object, such as a coding (e.g. QR, barcode, color coding). It may also be the physical appearance of the object itself. In the latter case, the detector is arranged for recognizing the physical appearance and/or activity of the object to enable identification of the object. This is for example done by means of a camera and/or image recognition techniques associated with it.

Moreover, the second signal of the second object and the third signal of the third object may both be a signal dedicated for the purpose of theft detection. Said signal may be a unique MAC address. Said signal may moreover be encrypted or coded, representing a unique identifier representing the object it is corresponding to, such that the first object is able to identify the signal, identify a pairing between signals and provide a theft detection.

However, the second signal of the second object and the third signal of the third object may also be a signal not initially dedicated for the purpose of theft detection. Such a signal may already be transmitted by the object, such as a MAC address. For example: a Wi-Fi signal indicating internet activity of an object, Bluetooth signal of an object for connecting with other objects, Radio Frequency signal indicating a communication action of the object, LoRa, another standard in the ISM band, VLC, GSM signal or GPS signal for navigating purposes, etc. The detector comprised by the first object may subsequently identify the object by recognizing and assessing such (initially not dedicated) signals (for theft detection). The detector may also identify a pairing between the second and the third object based on such not dedicated signals. For example: a smartphone of a user emitting a Bluetooth signal with a unique identifier (such as a MAC address) may be entering the detection area of the detector in pair with a user driving a car. The smartphone and car hence belong together. The car may also emit a Wi-Fi signal from which the car may be identified. Both signals are not initially dedicated for theft detection, however, the first object of the present invention may identify a pairing between the car and the smartphone based on both of said signals. Subsequently, a theft detection action, such as an alarm, may be performed when the car is moving out of the detection area without the (signaling of the) smartphone being detected. It may be advantageous for the second signal of the second object and the third signal of the third object to be a non dedicated signal for theft detection, because the first object for theft detection may unobtrusively detect a pairing of objects from their present signaling activity, which is already being present.

The detector may be arranged for detecting the second signal and the third signal. As mentioned before, the second signal and the third signal may be different types of signals. The detector may therefore be arranged for detecting at least one type of signal, thus able to detect various types of signals. In an embodiment, the detector may be a Wi-Fi receiver, Bluetooth receiver, ZigBee receiver, LoRa receiver, NFC chip reader, Radio Frequency antenna, Infrared detector, PIR sensor, thermal camera, microphone, optical sensor such as a camera, light diode, or any combination thereof. Such a combination may for example be a camera for detecting indicative signals with radio antenna for detecting various signals, or a microphone and camera, or Bluetooth and Wi-Fi receiver. The detector may also for example be equipped with additional image recognition techniques. The detector may be part of the first object, or alternatively, in an embodiment, the detector may be a separate stand-alone detector in connection with the first object.

The detector may also be able to detect multiple signals transmitted from a single object. An object may thus be able to emit multiple signals, which the detector may receive and/or select to provide in said detector output. For example: the third object may be a smartphone emitting a Bluetooth signal and a Wi-Fi signal. The detector may be a plurality of receivers or antennas able to detect such signals. The detector may also select to detect one of the two signals, for example depending on the signal strength and switch between the two different types of signals.

The detector may also be able to receive signals from more objects than the second signal of the second object and the third signal of the third object. Hence, in an embodiment, the detector may also be able to detect an N'th signal from an N'th object, wherein N is an integer larger than two. For example, from a fourth signal from a fourth object. This advantageously enables more elaborate theft detection, because a pairing between multiple objects may be identified and more elaborate conditions for theft detection may be introduced with more objects. For example: the controller may perform a theft detection action when the controller identifies a condition indicating (i) a paring of the second signal, the third signal, and the N'th signal; and (ii) the second signal moving out of the detection area while at least the third signal or the N'th signal is not being detected within the detection area. Therefore, the second signal may only be allowed to move out of the detection area without performing a theft detection action, if the third signal and the N'th signal are all being detected within the detection area. Alternatively, other relations may be considered, such as for example a condition indicating (i) a paring of the second signal, the third signal, and the N'th signal; and (ii) the second signal moving out of the detection area while the third signal and the N'th signal are all not being detected within the detection area. Thus that a second signal may only be allowed to move out of the detection area without performing a theft detection action, if the third signal or any of the N'th signal are being detected within the detection area, which is a less strict condition compared to the former example.

The detector comprises a detection area. The detection area specifies the area totally covered by the detector. In an embodiment, the detection area may comprise a plurality of detection subareas wherein the detector is arranged for detecting the second signal of the second object and the third signal of the third object when transmitted within one of the detection subareas of the detector. Or: the detection area is part of a plurality of detection subareas comprised within a total coverage area of the detector. It is an advantage to divide the detection area in a plurality of detection subareas, because the resolution of the detector, and thus the first object of theft detection, will be higher due to the increased number of areas for performing theft detection according to the invention.

Furthermore, in an embodiment, the detection area may be adjustable in size. The detector may thus be adjusted to provide a detection area with a smaller detection area than the default (physically largest possible) detection area of the detector. This is advantageous because the theft detection may be tailored to a specific area, and the tolerance for theft detection will be smaller. For example: a detector may be observing a city square, comprising multiple areas such as a fountain area and bicycle park area. The second object, e.g. be a bicycle, may be in pair with a third object, e.g. a cyclist's fitness watch. The default detection area of the detector is the area of the square, (as it is the physically largest possible detection area or coverage). The detector may be instructed to change the size of the detection area to the bicycle park area only. A controller associated with the detector may aid in this. The controller of the first object for theft detection may then be able to perform a theft detection action when the bicycle is moving out of the bicycle park area while the cyclist's fitness watch is not being detected in the bicycle park. Thus, the condition for performing a theft detection action is tailored to the bicycle area, instead of the larger square area. In such a way, the theft detection action may be advantageously performed earlier for a smaller detection area whenever theft occurs.

In a further embodiment, the controller is arranged for receiving an input signal for adjusting the size of the detection area. Said input signal may be provided to the controller by the second object, or the third object, or by any other object. This enables an object (which is subject to the theft detection of the first object) to provide a preference for the size of the detection area. Such a preference determines the resolution of the theft detection. For example: a second object (e.g. a smartphone) may be small, while the initial detection area (e.g. departure lobby in airport) is much larger. In such a case, a signal transmitted by the second object may be an incentive for the controller to adjust the size of the detection area to a smaller detection area, for example only a meter around the second object. Thus, a theft detection action may be performed by the controller when a condition for theft is detected according to the invention. Said input signal may therefore be a dedicated signal to serve as an input signal for adjusting the size of the detection area, or a non dedicated regular signal which may be interpreted by the detector or the controller as an input signal for adjusting the size of the detection area. It may for example be beneficial to adapt the detection area of the first object to the physical size of the second object. The controller may be provided with a computer program product to provide an algorithm able to adjust the size of the detection area depending on an input signal.

In an embodiment, the detector may also comprise a plurality of detectors. The plurality of detectors, and their corresponding local detection areas, may for example cover a larger detection area. Or: the plurality of detectors may more effectively cover a single detection area, which is advantageous, because some signals may be more effectively received from different angles or positions. For example: a plurality of Bluetooth receivers may be positioned in a shopping mall region to cover an area, which is larger than an area coverable by only one Bluetooth receiver. Moreover, a plurality of Bluetooth receivers may also be positioned in a shopping mall region, not necessarily covering an area larger than an area coverable by only one Bluetooth receiver, but the Bluetooth receivers may be positioned at different positions and/or orientation angles (e.g. at each corner of a square) such that a signal from a second and third object are effectively received in case of blocking of e.g. one of the receivers. Positioning (detection) accuracy may alternatively be improved by a plurality of detectors.

The detector may provide a detector output, which is suitable to be processed by a controller. Said detector output may be provided to the controller by a hardwired connection, or a wireless connection. In the latter case, the detector may be physically separate from the controller, such that the detector output may be communicated by a wireless signal. The detector output may for example comprise image data or an array of signal data.

The detector may comprise a communication device for detecting external signals communicated to the first object. Such signals may be messages from external devices, for example smartphones or wearables, or external database or servers. The detector output may then also comprise information contained within such signals.

Said controller is arranged for processing the detector output. The controller is also arranged for identifying a condition indicating a relation between the second signal and the third signal. Such a relation may for example be a pairing between the second signal of the second object and the third signal of the third object. Thus, the controller may be arranged for identifying a condition indicating a pairing of signals. The controller may be a processor. Such a processor may also be divided into multiple smaller processing units. Such a processor may also be able to analyze and process different detector output signals simultaneously. The controller is also arranged for performing a theft detection action. Such a theft detection action may comprise outputting an output signal for the theft detection action.

In an embodiment, said processing of the detector output may for example comprise image recognition processing, for example in case the detector output provides image data. By implementing image recognition technologies, indicative signals may be effectively evaluated.

The controller may also, for some type of signals, based on the detector output, assess the location and distance and/or orientation of the source of the signal being detected. This may effectively be performed for indicative signals received by a detected image of the detection area. The detector and controller may then be calibrated to detect and process accurate location and distance measures. The controller may be able to evaluate a signal strength, time of flight of a signal, or the directionality of a signal. This may effectively be performed for wireless transmitted signals by an object.

The theft detection action enables an action in response to a detected theft. It is advantageous not to only detect theft, but also act upon theft, such that the stolen object may be brought back into pair with the rightful owner or possessor. The theft detection action may be an action performed by the first object. Performing a theft detection action may also be read as initiating a theft detection action. Hence, the first object may perform a theft detection action itself physically, or initiate an action by instructing other objects to perform such an action. In an embodiment, the theft detection action may comprise an action from the group of monitoring, sending a notification, outputting a visual alarm or outputting an audible alarm. The visual alarm may e.g. comprise highlighting of the location of theft, following the movement of the second object with a spotlight, providing an alarming light scheme to the lighting infrastructure in the detection area, or providing an indication light to the location where the second object has left the detection area.

Furthermore, monitoring may e.g. comprise the tracking of the second signal of the second object by means of the lighting infrastructure or by other first objects according to the invention, storing signal data received by the detector at a time related to the moment of theft (for example at the time of theft, a time interval of a day before and/or after the theft), or taking images of the detection area after detection of theft. Monitoring may also comprise inducing a signal for taking photographs, for example with the detector itself, or by another optical recording means, or by accessible cameras in the vicinity of the first object. In the latter case, the first object may receive authorization to access the cameras in case of theft detection only. Alternatively, said accessible cameras may be attached to the first or second object. Monitoring may also comprise the recording and storing of Bluetooth, Wi-Fi, GSM and ZigBee profiles within the detection area. The first object may also induce other receivers to record and store such signals and profiles after detection of theft. Monitoring may also comprise the recording of video, and/or the analysis of body movements thereon, and/or facial recognition thereof to attempt to identify a thief.

In a further embodiment, the warning notification is send to governmental institutions, security companies, a registered owner of the second object, the third object, or receivers further detected within the detection area during time of theft. Such governmental institutions may e.g. be the municipality, the police department, an institution for preventing terrorism, or a database for monitoring theft data. Sending a notification to the registered owner of the second object may further e.g. comprise cell phone (GSM) text data, internet text data such as mail, or a message to a social media account. In the latter example, a detected theft may be uploaded to a dedicated social media account, application, or website. A notification, for example a digital push message, may also be send to at least one object identified within the detection area of the detector, such that at least one other object is notified that a theft is detected nearby.

Said pairing of the second signal and the third signal specifies that the second object and the third object belong together. Theft of the second object is then detected when the second signal may be moving out of the detection area while the third signal is not being detected within the detection area. A pairing may be identified by the controller by processing the detector output. A pairing may be identified by evaluating an observed relation of the second object and the third object within the detection area. Hence, in an embodiment, the controller is arranged for identifying a pairing of the second signal and the third signal, when the second signal and the third signal are moving in pair into the detection area. This identification is advantageous, because it is common that two objects entering an area together may belong together and hence form a pair. In case one object leaves the detection area while the other is not being detected, both objects will not move out said area together, hence a theft may be occurred. For two objects, this is a common and a most advantageous indicator of theft. However, in alternative examples with multiple objects in pair, a condition indicating theft may be more elaborate. For example, in case of a second, third, and fourth object: A second object may enter the detection area with the third and fourth object, but may also be allowed to leave with either the third or the fourth object, and only a theft detection action will be performed when the second object leaves with neither one of the other objects. In case of an N'th object, alternative theft detection relations may be implemented.

In some circumstances, theft is defined as the second object being breached by theft, such that the second signal of the second object is not able to transmit a signal. In those cases of theft, the second signal is also moved out of the detection area, but in an instance of breach, because the detector is not able to detect the signal. Hence, in an embodiment, the controller is arranged for identifying a condition indicating that the second signal moved out of the detection area by no longer detecting the second signal while it was being detected in the detection area. An advantage of such an embodiment is that also theft, wherein a beacon transmitting a second signal is malevolently breached or disabled, may be detected.

Said moving in pair into the detection area may comprise simultaneously moving into the detection area in time, or simultaneously moving into the detection area in time at the same location. This indicates a strong pairing between objects. The detector and controller of the first object may also be able to distinguish the second signal of the second object and the third signal of the third object, in case other signals of other objects are interfering with the detection of the detector. Such a distinguishing may be performed by an additional analysis module provided in the controller. Such an analysis module may make use of machine learning techniques, for example when the detector comprises a plurality of detectors to detect the second signal and the third signal from a plurality of signals (or from a plurality of suitable signals for theft detection).

The pairing of the second signal and the third signal may also be identified by accessing a database in which combinations of a possible pairing are listed. Hence, in an embodiment, the controller is arranged for accessing a pairing database comprising a list indicating whether the second signal and the third signal are a pair, and identifying a pairing of the second signal and the third signal, when in the pairing database the second signal and the third signal are listed as a pair. Such a pairing database is advantageous, because it may comprise a list of pairs for which theft detection is desired. The second object and third object may also move into the detection area at different moments of time and from different locations, while still an effective pairing may be identified.

The pairing database may comprise allowable and not allowable combinations of objects. The pairing database may be regularly updated. In an embodiment, the pairing database is arranged for receiving an authorization to access the pairing database. It is advantageous to provide an authorization to access the pairing database, because only authorized objects may then be able to perform actions with respect to the pairing database. Here, the pairing database may be hosted within an external server. The pairing database may also be hosted on a storage device, which is accessible. The pairing database may also be accessible by means of the internet. The pairing database may also be accessible via other types of wireless data connection means such as Bluetooth, Wi-Fi, ZigBee. Thus, even if the pairing database is not connected to the internet, it may still be widely accessible.

In an embodiment the pairing database may also be arranged for receiving updates. Thus, the list indicating whether the second signal and the third signal are a pair may be updated. Or alternatively: the list indicating whether the second signal, the third signal, and the N'th signal, wherein N is an integer larger than 3, are a pair. Such an update may comprise the registration of new pairing data, or the deletion of current pairing data, or amendments to current pairing data. Hence, in an embodiment, the pairing database may be arranged for receiving an input signal for amending a database value. Such an input signal for amending a database value may be provided by the second object or the third object (or the N'th object). This may be advantageous, because the second object and the third object may indicate that they are in pair by means of sending an input signal to the pairing database, such that the pairing database may receive said signal and amend a database value to represent the pairing between the second object and third object. In this way, it is advantageously provided by the invention to allow objects to choose for theft detection.

Such an input signal for amending a database value may, in an embodiment, also be provided by an external user input signal. For example: a user may provide a user input signal comprising an amendment of a database value. Such an amendment may comprise the addition or deletion of a pairing to the listing of the pairing database. This is advantageous, because an external user may determine which objects will be paired, such that the first object may provide theft detection for those objects.

In an embodiment the pairing database may also be arranged for only receiving updates from objects detected in the detection area of the detector. Alternatively, said objects detected in the detection area of the detector may also comprise objects detected in the detection area of other detectors with an adjacent detection area adjacent to the detection area. Alternatively, objects detected in further detection areas selectable by the controller based on an user input signal. This is advantageous, because the pairing database may be dedicated to a limited amount of objects present in the detection area.

As mentioned before, the pairing database may be hosted in an external server or a storage device. The pairing database may be located separately from the first object. Thus the location of e.g. a server hosting the pairing database may be different than the location of the first object. Both may communicate by means of an internet or alternative data connection. However, the pairing database may also be integrated with the first object. Hence, in an embodiment, the first object may further comprise a storage device for hosting the pairing database locally within the first object. Hosting the pairing database locally within the first object is advantageous, because it provides an autonomous first object, without the need to communicate to other entities to receive pairing information. In an example, the pairing database is locally hosted within the first object. A user with a smartphone and bicycle enters the detection area of a detector of a first object. The user may then send an input signal with the smartphone for amending a database value to the first object, such that a pairing of the smartphone and the bicycle is registered as a pair in the pairing database. The Bluetooth signal of the smartphone and a RF signal of the bicycle may then be identified as a pair by a first object for theft detection according to the invention. When the bicycle moves out of the detection area, of the detector of said first object, while the smartphone is not being detected, the controller of the first object may perform a theft detection action.

In an embodiment, the controller may be further arranged for receiving an input signal from an application provided on a user device, wherein the input signal comprises an identification of a pairing of the second signal and the third signal. This is advantageous, because the controller may be aided in identifying a pairing of the second signal and the third signal by means of an input signal provided by an application on a user device. A user device may thus be implemented to indicate a pairing. For example: A user may use an app to indicate a pairing of a bicycle with the smartphone the app is running on. The pairing created within the app may be comprised within a signal generated by the app. The app will send said signal as an input signal to the controller of the first object of the invention, such that the controller may identify a pairing of the second signal and the third signal by processing the detector output, wherein the input signal is comprised.

In some cases, the second object may provide monetary transactions in return for the theft detection of the first object, and in particular for the theft detection action following a possible theft of the second object. Hence, in an embodiment, the controller is arranged for identifying the condition, the condition further indicating (iii) a monetary transaction for theft detection. Such a monetary transaction may be communicated to the first object. Hence, the detector is further arranged for receiving information on a monetary transaction, wherein the detector output comprises the information on the monetary transaction. An advantage of such an embodiment is that the service for theft detection may be performed for registered and known users, which have provided a monetary transaction for theft detection. This may allow different providers of the first object according to the invention, which improves competition in the market. For example: A user may use an app to indicate a pairing of a car with the wearable device the user is wearing. With the app the user is also able to perform a payment for theft detection. The pairing created within the app and the registration of the monetary transaction may be comprised within a signal generated by the app. The app will send said signal as an input signal to the controller of the first object of the invention, such that the controller may identify a pairing of the second signal and the third signal, and also identify a monetary transaction for theft detection, by processing the detector output wherein the input signal is comprised. Theft detection may then be provided according to the invention.

In an embodiment, the first object of the present invention is provided, wherein the first object is part of a lighting infrastructure; the second object is a vehicle; the third object comprises a key device. Such a combination may be advantageous, because lighting infrastructure is well suited for (as a part thereof) comprising a first object for theft detection, since lighting infrastructure is widespread and commonly provides a top view on illuminated regions. The second object may be a vehicle, because vehicles are prone to theft and desire effective theft detection. The third object may be key device, such as any device acting as a key to authorize the use of the second object, because a key device and the second device are commonly already in pair with each other.

In an embodiment, the first object of the present invention may be part of a lighting infrastructure. This is advantageous because lighting infrastructure is widespread and commonly has a top view on illuminated regions. In a further embodiment, the first object is a light pole. Such a light pole (as first object) may comprise a camera for detecting a second signal of the second object and a third signal of the third object when transmitted within a detection area of the detector. This is advantageous, because a light pole may provide a larger (top) view on a region when the pole becomes larger. The first object may also be any other lighting fixture, such that the illuminated region and detection area may be overlapping. The first object may for example also be an indoor lighting fixture illuminating a room. It may therefore provide theft detection for that particular room. Furthermore, a light pole may also provide a better line of sight for detecting signals, in particular wireless communication signals or indicative signals.

In an embodiment, the first object may be part of an object selected from the group of: an electronics device, a vehicle, an architectural feature of a building, or a security camera. In another embodiment, the first object may be embodied as a theft detection device, which is able to be located in a region wherein theft detection is desired. Said electronics device may be a smartphone, a user wearable device, such as a smartwatch or glass, a laptop, a tablet, or a smart light bulb. Such devices may be mobile. Such devices may be able to provide theft detection to specific regions close to those devices. For example, a laptop locked to a table may be used as a first object according to the invention to detect theft of other objects, which for example were not able to be locked to a table.

The invention according to the present application may be implemented within an area prone to theft, such as a shopping mall, a retail, a hospital, a car park, a bicycle park, a city square, a beach, library, working/office space, an airport or a railway station.

In an alternative embodiment, the first object may be part of a drone. In yet an alternative embodiment, the first object may be part of a satellite, zeppelin, blimp, balloon, airplane, or helicopter. These examples indicate that theft detection may be provided by a first object being part of a moving, or flying, object. This is advantageous, because the detection area of the first object may be larger and/or more widespread. A service of theft detection may then be moved to a desired location. The drone may for example be flown to a park, where it provides theft detection in the afternoon, while it will be flown to a square, where it will be providing theft detection at night.

In an embodiment, the second object may be a vehicle. Vehicles are often stolen and desire theft detection. Such a vehicle may be a bicycle, automobile, boat, motorcycle, or drone. In an embodiment, the second object may be an electronics device. Electronics devices are often stolen and desire theft detection. Such an electronics device may be: a smartphone, a wearable device such as a smartwatch, smart clothing, fitness tracker or glass, a notebook, a tablet, a toy, a drone, a household device, a television, a smart light bulb, a game console, a computer, a battery unit (e.g. for bicycle), or a tool. Some second objects may only be able to provide indicative signals. In an embodiment, the second object may be jewelry, expensive clothing items, artwork, a person, a pen, a toy, or household equipment. Such items may also be stolen, for which theft detection is thus advantageous.

In an embodiment, the third object may be a key device. In another embodiment, the third object may be a smartphone or a wearable device. Such devices may be paired with a second object, such that the presence of these devices authorizes a use of the second object. Alternatively, said third object may be an electronics device, such as a detachable bicycle light.

In an embodiment, second, third and/or an N'th object may be a similar type of device. Here, N is an integer larger than 3. For example, all objects may be a smartphone. In this way, a first object may provide theft detection for at least two smartphones identified as a pair. For example: when a plurality of N smartphones is stored in a room (for example a locker/dressing room when the owners of the smartphones are performing sports in the meanwhile) a first object may provide theft detection, wherein the detection area may be the room. Whenever a smartphone from the plurality of N smartphones moves out of the detection area (the room), the controller of the first object may provide a theft detection action. This allows for the plurality of smartphones, all in pair to each other, to be secured within a room.

In an embodiment, the first object of the present invention is provided, wherein the first object is part of an indoor luminaire; the second object is an electronics device; the third object comprises a key device. Such a combination may be advantageous, because lighting infrastructure is well suited for (as a part thereof) comprising a first object for theft detection, since lighting infrastructure is widespread and commonly provides a top view on illuminated regions. Said key device may be a smartphone or wearable.

It is a further object of the invention to provide an improved system for theft detection, which is able to detect theft of a second object, which is in pair with a third object. Thereto, the invention provides a system for theft detection of a second object, the second object being in pair with a third object for securing the second object, the system comprising: the first object according to the first aspect of the invention; a second object comprising a second beacon for sending a second signal; a third object comprising a third beacon for sending a third signal. Such a system may provide theft detection for a second object pairable with a third object by means of a first object. Such a theft detection architecture is advantageous, as also mentioned before for the first aspect of the invention, because it provides an autonomous and unobtrusive system for theft detection of two objects being in pair (belonging together, the one securing the other).

The advantages applying to the first object of the first aspect of the invention also apply to the system defined in the second aspect of the invention.

In the second aspect of the invention, the second object and the third object comprise respectively a second beacon and third beacon for sending respectively the second signal and the third signal. Such a beacon may be an antenna, chip or electronic sending device. Such a beacon may enable communication by means of Wi-Fi, ZigBee, LoRa, other standard in ISM band, Bluetooth, Radio Frequency (RF), Infrared (IR), Visible Light Communication (VLC), audio.

In an embodiment, the system according to the second aspect of the invention is provided, wherein the first object is part of a lighting infrastructure. Such a system is advantageous, because providing said first object as part of a lighting infrastructure enables a widespread theft detection. Lighting infrastructure is namely a widespread infrastructure present in an indoor environment (such as domestic lights, office lighting fixtures, building lighting, parking space lighting, etc) and in an outdoor environment (such as public space lighting, outdoor lighting fixtures, road lighting, etc). Being part of a lighting infrastructure, the first object comprised in the system for theft detection may enable theft detection with a coverage area in many environments. Furthermore, as lighting infrastructure is usually on a higher level to illuminate an area below lighting fixtures, the first object being part of the lighting infrastructure may benefit from an advantageous position to receive signals or to detect signals. In an embodiment, the first object is part of a light pole.

In an embodiment, the system according to the second aspect of the invention is provided, wherein the system further comprises at least an N'th object, wherein N is an integer larger than 3; wherein the detector is further arranged for detecting the N'th signal; wherein the controller is further arranged for further identifying a condition indicating (i) a paring of the second signal, the third signal, and the N'th signal; and (ii) the second signal moving out of the detection area while at least the third signal or the N'th signal is not being detected within the detection area. For example: The second object may be a car, while the third object may be a smartphone. The N'th object may also be a smartphone, wherein N is the integer 5. Hence, the fourth object and the fifth object may be a smartphone. All objects may emit a Bluetooth beacon. Said first object may detect theft whenever the second signal is moving out of the detection area while none of the signals of the other objects are being detected within the detection area. In this way, the second object, which is the car, may be paired with multiple smartphones, each authorizing the second object and preventing theft when the car leaves with none of them. Furthermore, alternative pairing relations may also be provided when the system comprises multiple objects, which is advantageous.

In an embodiment, the system according to the second aspect of the invention is provided, wherein the third object is a key device, smartphone or smart wearable device. In such a system, the key device may also be a smartphone. The key device may e.g. be any device authorized to enable the use of the second object by means of its functions or presence. Such third objects may emit third signals which are dedicated for theft detection, or which are not initially dedicated for theft detection, such as regular signaling traffic. Regular signaling traffic may be Wi-Fi traffic, Bluetooth traffic, ZigBee traffic, GSM, LoRa, other standard in ISM band, IR, RF, audio or VLC. The first object may detect such signaling traffic as the third signal and associate it to a second signal detected from a second object.

In an embodiment, the system according to the second aspect of the invention is provided, wherein the second object is a vehicle or electronics device. Such devices are prone to theft, hence it is desired to provide a system for theft detection comprising such devices. A vehicle may for example be a bicycle, automobile, boat, motorcycle, airplane, or drone. An electronics device may for example be a smartphone, a wearable device such as a smartwatch, smart clothing, fitness tracker or glass, a notebook, a tablet, a toy, a drone, a household device, a television, a smart light bulb, a game console, a computer, or a tool.

The pairing of the second signal and the third signal may also be identified by accessing a database in which combinations of a possible pairing are listed. In an embodiment, the system according to the second aspect of the invention is provided, the system further comprising a pairing database comprising a list indicating whether the second signal and the third signal are a pair; wherein the list is adjustable by an external input. Such a pairing database is advantageous, because it may comprise an adjustable list of pairs for which theft detection is desired. The list enables objects to freely choose for implementing theft detection, because objects may be able to provide an external input comprising an instruction to add a pairing to the pairing database, or to delete a pairing listed in the pairing database. Such an external input may also be a user input, or an input derived from a user input. For example, a second object may be a smartphone, where a user has provided a user input not to register the smartphone as the second object comprised within the system for theft detection. The smartphone, may then send an additional feature or signal indicating this choice. The first object of the system may not detect the smartphone as a second object. Conversely, the user input may be a selection of the smartphone as the second object, by e.g. toggling a switch in the user interface to an enabling status.

In an embodiment, the system according to the second aspect of the invention is provided, wherein the theft detection action comprises an action from the group of monitoring, sending a notification, outputting a visual alarm, outputting an audible alarm; wherein the warning notification is sent to governmental institutions, security companies, a registered owner of the second object, the third object, or receivers further detected within the detection area during time of theft. Such a theft detection action may be advantageous in indicating the theft.

As mentioned before: The visual alarm may e.g. comprise highlighting of the location of theft, following the movement of the second object with a spotlight, providing an alarming light scheme to the lighting infrastructure in the detection area, or providing an indication light to the location where the second object has left the detection area. Furthermore, monitoring may e.g. comprise the tracking of the second signal of the second object by means of the lighting infrastructure or by other first objects according to the invention, storing signal data received by the detector at a time related to the moment of theft (for example at the time of theft, a time interval of a day before and/or after the theft), or taking images of the detection area after detection of theft. Monitoring may also comprise inducing a signal for taking photographs, for example with the detector itself, or by another optical recording means, or by accessible cameras in the vicinity of the first object. In the latter case, the first object may receive authorization to access the cameras in case of theft detection only. Monitoring may also comprise the recording and storing of Bluetooth, Wi-Fi, RF, LoRa, GSM and ZigBee profiles within the detection area. The first object may also induce other receivers to record and store such signals and profiles after detection of theft. Monitoring may also comprise the recording of video, and/or the analysis of body movements thereon, and/or facial recognition thereof to attempt to identify a thief. Governmental institutions may e.g. be the municipality, the police department, an institution for preventing terrorism, or a database for monitoring theft data. Sending a notification to the registered owner of the second object may further e.g. comprise cell phone (GSM) text data, internet text data, or a message to a social media account. In the latter example, a detected theft may be uploaded to a dedicated social media account, application, or website. A notification, for example a digital push message, may also be send to at least one object identified within the detection area of the detector, such that at least one other object is notified that a theft is detected nearby.

In an embodiment, the system according to the second aspect of the invention is provided, the system further comprising a further device for receiving a theft detection action signal from the first object, wherein the further device is able to perform a theft detection action. A system of smart outdoor street lighting may for example receive a theft detection action signal from the first object. Such an outdoor street lighting system may subsequently monitor the second object, send notifications to other objects in the vicinity of the outdoor street lights, or illuminate the second object with a lighting scheme when detected.

Furthermore, in an embodiment, the system according to the second aspect of the invention is provided, wherein the theft detection action comprises taking an image of the detection area or tracking the second signal. Tracking the second signal of the second object is advantageous, because after the identification of theft, it may be beneficial to localize the second object. Said theft detection action may be performed by the first object, or it may also provide a signal (or incentive) for other objects to perform the same theft detection action.

It is a further object of the invention to provide an improved method for theft detection, which is able to detect theft of a second object, which is in pair with a third object. Thereto, the invention provides a method performed by a first object for theft detection of a second object, the second object being in pair with a third object for securing the second object, the method comprising: detecting, with a detector comprised within the first object and within a detection area of the detector, a second signal of the second object and a third signal of the third object; providing a detector output of the detector to a controller; identifying, with the controller, by processing the detector output, a condition indicating both (i) a pairing of the second signal and the third signal, and (ii) the second signal moving out of the detection area while the third signal is not being detected within the detection area; performing a theft detection action when the condition is identified. Such a theft detection method is advantageous, as also mentioned before for the first aspect of the invention, because it provides an autonomous and unobtrusive method for theft detection of two objects being in pair (hence belonging together).

In an embodiment, the method according to the third aspect of the invention is provided, wherein the method further comprises: identifying, with the controller, a pairing of the second signal and the third signal, when the second signal and the third signal are moving in pair into the detection area.

In an embodiment, a method is provided according to the methods above of the third aspect of the invention, wherein the method further comprises: accessing, with the controller, a pairing database comprising a list indicating whether the second signal and the third signal are a pair, and identifying, with the controller, a pairing of the second signal and the third signal, when in the pairing database the second signal and the third signal are listed as a pair.

The advantages applying to the first object of the first aspect of the invention also apply to the method defined in the third aspect of the invention The invention further relates to a computer program product. Hence, the invention provides a computer program product for a computing device, the computer program product comprising computer program code to perform the methods of the present invention mentioned above when the computer program product is run on a processing unit of the computing device. Said computer program product may be executed by the lighting system according to the invention. For example, said processing unit may also be the processor according to the invention or a separate processor provided in the first object. Performing abovementioned method by means of the computer program product may include only the features of the method implementable by means of a computer program product. The first object may also host a computing device for executing a plurality of computer program products simultaneously. This may be advantageous whenever multiple services are provided for theft detection.

Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

In some examples, the first object may be fixed to an area, e.g. such an area may be the detection area. The first object may be stationary, or fixed to a location. The first object, the second object, and third object may be unrelated in primary function, independent and/or separate. Furthermore, the second signal may be representative of the second object, and the third signal may be representative of the third object. Furthermore, as the first object may independent from the second object and from the third object, the first object may also lie able to provide theft de for a plurality of second objects in pair with corresponding third objects.

BRIEF DESCRIPTION OF THE DRAWINGS

The invention will now be further elucidated by means of the schematic non-limiting drawings.

DETAILED DESCRIPTION OF THE EMBODIMENTS

Figure 1A:
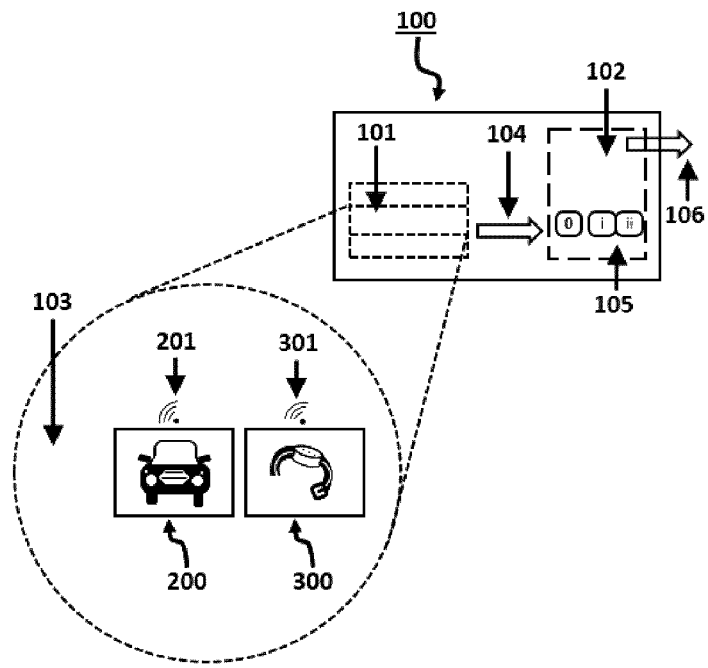
FIG. 1A shows schematically an embodiment of a first object for theft detection of a second object, the second object being in pair with a third object for securing the second object.
Figure 1B:
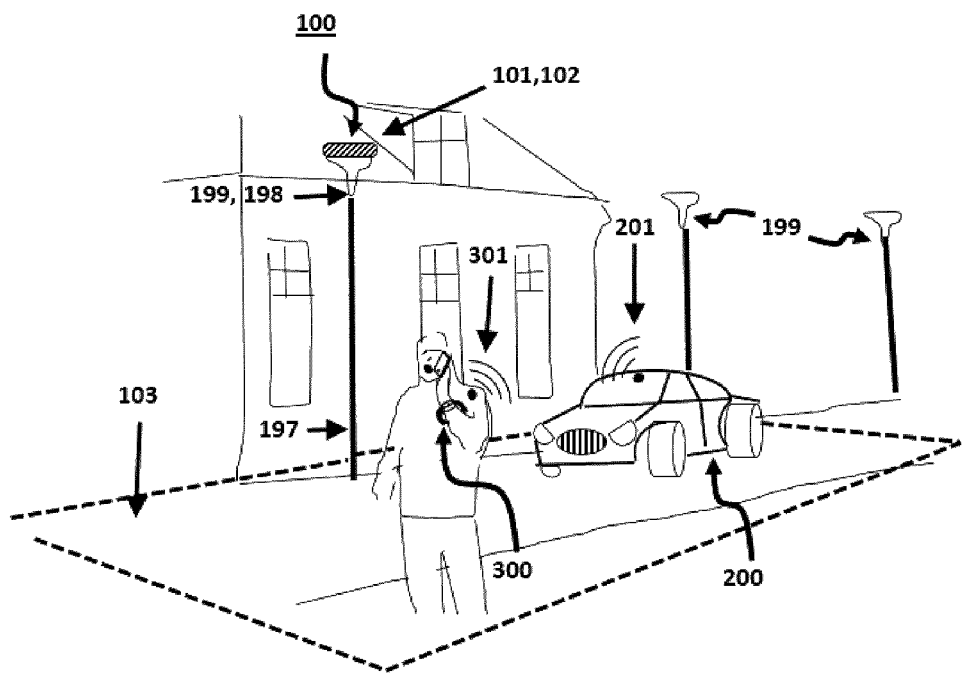
FIG. 1B depicts schematically a perspective view thereof

FIG. 1A and FIG. 1B depict schematically, by non-limiting example, an embodiment of a first object 100 for theft detection of a second object 200, the second object 200 being in pair with a third object 300 for securing the second object 200. FIG. 1B is in perspective view. The second object 200 is paired with the third object 300 for securing the second object 200. Hence, such a pairing indicates that the second object 200 and the third object 300 belong together. The first object 100 comprises a detector 101, which detects a second signal 201 of the second object 200 and a third signal 301 of the third object 300 when transmitted within a detection area 103 of the detector 101. The detector further provides a detector output 104.

In the embodiment depicted in FIG. 1A-1B, the second object 200 is a vehicle, such as for example an automobile. In alternative embodiments (not depicted), the second object may be another vehicle such as a bicycle, boat, motorcycle or drone; further, the second object may alternatively be an electronics device such as a smartphone, wearable device, smartwatch, smart clothing, fitness tracker or glass, a notebook, a tablet, a toy, a household device, a television, a smart light bulb, a game console, a computer, or a tool; yet further the second object may alternatively be jewelry, expensive clothing items, artwork, a pen, or household equipment. Since automobiles are stolen often, it is advantageous to provide theft detection for such an object. The mentioned alternative second objects are also prone to theft and desire theft detection, hence the invention also provides an advantage for such objects.

In the embodiment depicted in FIG. 1A-1B, the third object 300 is a key device, such as for example a smartwatch. The smartwatch is paired with the automobile (the second object 200) for securing the automobile and providing theft detection by means of the first object 100 of the present invention. In alternative embodiments (not depicted), the third object may be another key device, such as a passive key, a car key, etc. The third object may further be a smartphone, another wearable or a personal electronics device with a transmitter. Such devices (acting as the third object) may be paired with a second object 200, such that the presence of these devices authorizes a use of the second object 200.

Referring to the embodiment depicted in FIG. 1A-1B, the first object 100 is part of a lighting infrastructure 199, more specifically part of a smart outdoor luminaire 198 on a light pole 197. The first object 100 comprises additional communication technologies to communicate with other objects, for example other objects connected to the lighting infrastructure 199. The detector 101 of the first object 100 has a top view on the detection area 103, such that the second signal 201 and the third signal 301 are received well. Alternatively, the first object may be part of an indoor luminaire. Yet alternatively, in other embodiments (not depicted), the first object may be part of an object selected from the group of: an electronics device, a vehicle, an architectural feature of a building, or a security camera. Said electronics device may be a smartphone, a user wearable device, such as a smartwatch or glass, a laptop, a tablet, or a smart light bulb. Yet alternatively, the first object may be embodied as an autonomous theft detection device. Furthermore, in an alternative embodiment, the first object may be part of a drone. In yet an alternative embodiment, the first object may be part of a satellite, zeppelin, blimp, balloon, airplane, or helicopter.

Still referring to the embodiment depicted in FIG. 1A-1B, the detector 101 detects the second signal 201 of the second object 200 and the third signal 301 of the third object 300. The second signal 201 is a unique Wi-Fi signal transmitted from a local Wi-Fi beacon in the automobile. The third signal 301 is a Bluetooth signal transmitted as regular Bluetooth traffic of the smartwatch (the third object 300). The third signal 301 is however identifiable as a unique signal belonging to the smartwatch. The smartwatch may also emit a 4G mobile internet signal (not shown), which may alternatively be detected by the detector 101 and selected to serve as the third signal 301 for theft detection instead of the Bluetooth signal. Both the second signal 201 and third signal 301 are not initially dedicated for theft detection, but belong to the regular signaling traffic of the object, such as internet or cell-phone traffic. However, in alternative embodiments said signals may be dedicated signals for the purpose of theft detection, and may be encrypted or coded.

Alternatively, the second signal 201 of the second object 200 and the third signal 301 of the third object 300 may be a signal selected from the group of a Wi-Fi signal, a Bluetooth signal, ZigBee, Radio Frequency (RF), Long Range Low Power (LoRa), Infrared (IR), Near Field Communication (NFC), audio signal, or Visible Light Communication (VLC) signal; or any combination thereof.

Yet alternatively, in other embodiments (not shown), the second signal 201 or the third signal 301 may also be an indicative signal. Such a signal is not transmittable wirelessly, but still detectable by the detector 101. Said signal may for example be a thermal footprint of an object, or a coded thermal footprint of an object. The (coded) thermal footprint may then be detectable with a camera, thermal image detector, or PIR sensor. Another indicative signal may be a visual property of an object, such as QR coding, barcode, color coding. It may also be the physical appearance of the object itself. In the latter case, the detector is arranged for recognizing the physical appearance and/or activity of the object to enable identification of the object. This is for example done by means of a camera and/or image recognition techniques associated with it (and/or sonic/ultrasonic recognition techniques).

Still referring to the embodiment depicted in FIG. 1A-1B, the first object 100 further comprises a controller 102. The controller 102 is able to process the detector output 104 of the detector 101. The controller 102 identifies, by processing the detector output 104, a condition 105 indicating both (i) a pairing of the second signal 201 and the third signal 301, and (ii) the second signal 201 moving out of the detection area 103 while the third signal 301 is not being detected within the detection area 103. Such a condition 105 indicates a theft detection. The controller 102 further performs a theft detection action 106 when the condition 105 is identified.

The detector 101 detects the second signal 201 and the third signal 301. However, the detector may also be able to detect other signals, or receive other information by wireless communication. The detector depicted in FIG. 1A-1B is a detector 101 comprising at least a Wi-Fi receiver and a Bluetooth receiver. Hence, the detector 101 comprises a plurality of receivers and/or antennas. Alternatively or additionally, the detector 101 comprises a camera for receiving information from the detection area 103. In alternative embodiments (not depicted) the detector 101 may moreover comprise at least a ZigBee receiver, GSM antenna, NFC chip reader, Radio Frequency antenna, Infrared detector, PIR sensor, thermal camera, microphone, optical sensor such as a camera, light diode, or any combination thereof. Such a combination may for example be a camera for detecting indicative signals with radio antenna for detecting various signals, or a microphone and camera, or Bluetooth and Wi-Fi receiver. The detector may also alternatively be equipped with additional image recognition techniques.

The detector 101 comprises a detection area 103. The detection area 103 specifies the area totally covered by the detector. Here, the detection area 103 is a single detection area. However, alternatively (not depicted), the detection area may be part of a plurality of detection subareas comprised within a total coverage area of the detector. It is an advantage to divide the detection area in a plurality of detection subareas, because the resolution of the detector, and thus the first object of theft detection, will be higher due to the increased number of areas for performing theft detection according to the invention.

In the embodiment depicted in FIG. 1A-1B, the detector 101 is a single detector embodied within the first object 100. Alternatively, the detector may comprise a plurality of detectors. The plurality of detectors, and their corresponding local detection areas, may for example cover a larger detection area. Or: the plurality of detectors may more effectively cover a single detection area, which is advantageous, because some signals may be more effectively received from different angles or positions.

The detector 101 provides a detector output 104, which is suitable to be processed by the controller 102. Said detector output 104 is provided by a hardwired connection, as the detector 101 and controller 102 are embodied within a single body of a first object 100. Alternatively, for example in case the detector is separate from the controller or comprises a plurality of detectors, the detector output may be sent to the controller by a wireless connection. Hence, the detector output may be communicated by a wireless signal.

Still referring to the embodiment depicted in FIG. 1A-1B, the detector output 104 comprises signaling data of the second signal 201 and the third signal 301 within the detection area 103. Alternatively, in other embodiments (not depicted), the signaling data may comprise other signaling data, image data, or communication data communicated to a receiver comprised within the detector.

Still referring to the embodiment depicted in FIG. 1A-1B, as mentioned before, the controller 102 is arranged for processing the detector output 104. Based on the detector output 104, the controller 102 identifies a condition 105 indicating (i) a pairing of the second signal 201 and the third signal 301, and (ii) the second signal 201 moving out of the detection area 103 while the third signal 301 is not being detected within the detection area 103. The controller 102 is a processor, which is able to analyze and process the detector output 104. The controller 102 may also determine the signal strength, directionality and/or the location of the signal. The controller 102 may also alternatively provide image recognition technologies, such that e.g. indicative signals may be processed. This may effectively be performed for wireless transmitted signals by an object.

Said pairing of the second signal 201 and the third signal 301 specifies that the second object 200 and the third object 300 belong together. Theft of the second object 200 is detected when the second signal 201 may be moving out of the detection area 103 while the third signal 301 is not being detected within the detection area 103. A pairing is identified by the controller 102 by processing the detector output 104. A pairing is here identified by evaluating an observed relation of the second object 200 and the third object 300 within the detection area 103. Hence, referring to the embodiment depicted in FIG. 1A-1B, the controller 102 identifies a pairing of the second signal 201 and the third signal 301, when the second signal 201 and the third signal 301 are moving in pair into the detection area 103. This identification is advantageous, because it is common that two objects entering an area together may belong together and hence form a pair. In case an object leaves the detection area while the other is not being detected, both objects will not move out said area together, hence a theft may be occurred. For two objects, this is the simplest most advantageous indicator of theft.

Alternatively, theft is defined as the second object 200 being breached by theft, such that the second signal 201 of the second object 200 is not able to transmit a signal. In those cases of theft, the second signal 201 is also considered to be moved out of the detection area 103, but in an instance of breach, because the detector 101 is not able to detect the second signal 201.

Said moving in pair into the detection area 103 may comprise simultaneously moving into the detection area 103 in time, or simultaneously moving into the detection area 103 in time at the same location. This indicates a strong pairing between objects. In case other signals of other objects are interfering with the detection of the detector 101, the detector 101 and controller 102 of the first object 100 may also be able to distinguish the second signal 201 of the second object 200 from such signals, and also distinguish the third signal 301 of the third object 300 from such signals. Such a distinguishing may be performed by an additional analysis module (not depicted) provided in the controller 102, wherein the analysis module detects multiple signals transmitted from an object and picks one of the signals for theft detection according to the present invention.

Still referring to the embodiment depicted in FIG. 1, the theft detection action 106 is an alarm signal provided by the controller 102 comprising instructions to perform a single or multiple physical theft detection actions. Here, one physical theft detection action 106 is performing a visual alarm by providing a lighting scheme to the detection area 103. Therefore, the controller 102 sends a theft detection action signal to the outdoor luminaire 198 (of which the first object 100 is a part of) to provide said lighting scheme (not depicted). Alternatively, the theft detection action signal may be sent to other light sources in the vicinity of the detection area 103, for example other light sources within the lighting infrastructure 199. Another physical theft detection action 106 is monitoring the detection area 103 by means of a camera. Monitoring comprises inducing a signal for taking photographs, for example with a camera comprised within the detector 101 itself, or alternatively: by another optical recording means or by accessible cameras in the vicinity of the first object. In the latter case, the first object may receive authorization to access the cameras in case of theft detection only. Thus: said camera may be part of the outdoor luminaire 198, may be the detector 101, or may be a camera in the vicinity of the detection area 103 able to follow instructions. Furthermore, another physical theft detection action 106 is sending a notification message to all objects in the detection area 103 able to receive the message; and sending a notification message to the smartwatch (the third object 300) via an internet connection.

Alternatively, the visual alarm may comprise highlighting of the location of theft, following the movement of the second object with a spotlight, providing an alarming light scheme to the lighting infrastructure in the detection area, or providing an indication light to the location where the second object has left the detection area. Yet alternatively, monitoring may comprise the tracking of the second signal of the second object by means of the lighting infrastructure or by other first objects according to the invention, storing signal data received by the detector at a time related to the moment of theft (for example at the time of theft, a time interval of a day before and/or after the theft), or taking images of the detection area after detection of theft. Monitoring may also comprise the recording and storing of Bluetooth, Wi-Fi, LoRa, GSM, RF and ZigBee profiles within the detection area. The first object may also induce other receivers to record and store such signals and profiles after detection of theft. Monitoring may also comprise the recording of video, and/or the analysis of body movements thereon, and/or facial recognition thereof in an attempt to identify a thief.

Alternatively, in other embodiments, a warning notification may be send to governmental institutions, security companies, a registered owner of the second object, the third object, or receivers further detected within the detection area during time of theft. Sending a notification to the registered owner of the second object may further e.g. comprise cell phone (GSM) text data, internet text data, or a message to a social media account. In the latter example, a detected theft may be uploaded to a dedicated social media account, application, or website. A notification, for example a digital push message, may also be send to at least one object identified within the detection area of the detector, such that at least one other object is notified that a theft is detected nearby. Furthermore, governmental institutions may e.g. be the municipality, the police department, an institution for preventing terrorism, or a database for monitoring theft data.

Figure 2:
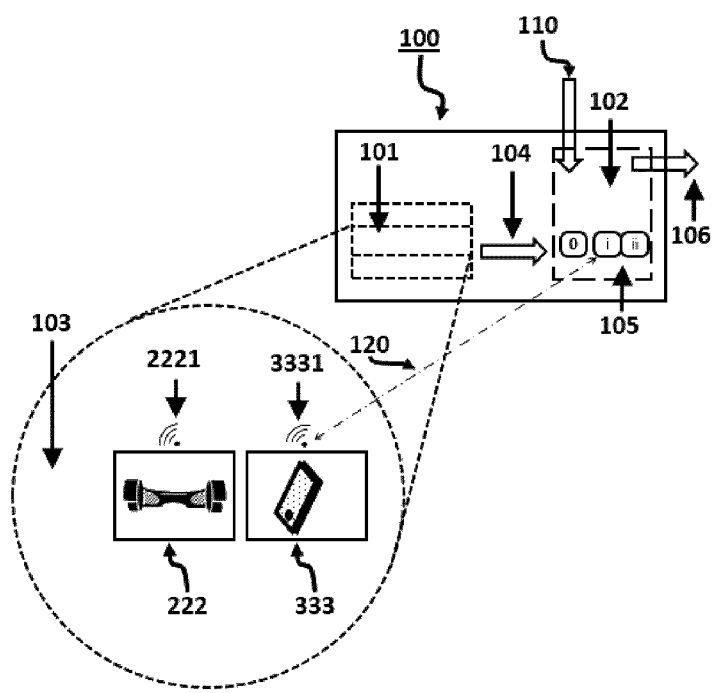
FIG. 2 depicts schematically an embodiment of a first object for theft detection of a second object, the second object being in pair with a third object for securing the second object, the first object comprising a detector and a controller; wherein a pairing is indicated by the third object.

FIG. 2 depicts schematically, by non-limiting example, an embodiment of a first object 100 for theft detection of a second object 222, the second object 222 being in pair with a third object 333 for securing the second object 222, which is partly similar to the embodiment in FIG. 1A-1B, but wherein: the first object 100 is an autonomous standalone device arranged for theft detection; the second object 222 is an hover board; the third object 333 is a smartphone; the controller 102 is additionally arranged for receiving an input signal 120 from an application provided on the smartphone (being the third object 333).

Said hover board, which is the second object 222, comprises a unique Bluetooth beacon sending out a Bluetooth signal 2221 for the purpose of theft detection. Said smartphone, which is the third object 333, transmits a third signal 3331, which is a Wi-Fi signal based on regular internet traffic, but wherein the third object is identifiable. For example with its MAC address. The detector 101 is able to detect these signals 3331, 2221 within the detection area 103 and provide a detector output 104.

The third object 333, the smartphone, utilizes an application to send an input signal 120 e.g. by the internet or directly by Bluetooth. Said input signal 120 comprises an identification of a pairing of the second signal 2221 and the third signal 3331. The controller 102 is thus aided (by the third object 333) in identifying a paring of the second signal 2221 and the third signal 3331. Namely, the user using the third object 333 indicates that the smartphone and the hover board are a pair, and hence that theft detection is desired, for example because the user is going to leave the hover board behind as the user may enter a building.

However, theft detection is a service. This service is not without charge. Hence, indicating that the smartphone and the hover board are a pair and that theft detection is desired, costs an amount of monetary units (a payment). Therefore, the third object 333, the smartphone, uses an application to provide a monetary transaction or payment. The monetary transaction is done over the internet and registered on a server (not shown). The server then forwards a registration of the monetary transaction 110 for theft detection to the first object 100 by means of an internet connection. This connection is wireless, but may alternatively be by a wired connection. The controller is able to receive and interpret this registration of the monetary transaction 110, after which the input signal 120 indicating an identification of a pairing of the third object 333 is accepted. Alternatively, other communication routes may be available for ensuring a payment is performed for the theft detection (service), such as directly communicating the monetary transaction to the first object 100. Theft detection may then be provided according to the invention, partly similar to the theft detection explained for the embodiment depicted in FIG. 1A-1B.

Figure 3:
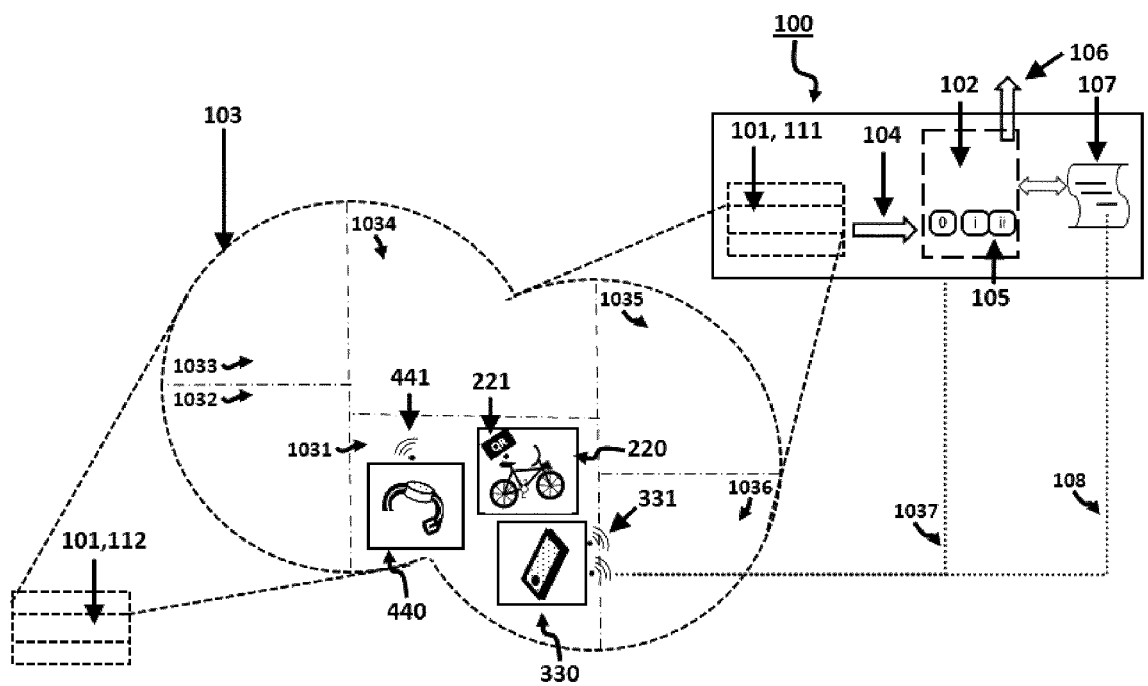
FIG. 3 depicts schematically an embodiment of a first object for theft detection of a second object, the second object being in pair with a third & fourth object for securing the second object, the first object comprising a detector and a controller, further comprising locally a pairing database.

FIG. 3 depicts schematically an embodiment of a first object 100 for theft detection of a second object 220, the second object 220 being in pair with a third object 330 and a fourth object 440 for securing the second object 220. The first object 100 comprises a detector 101 and a controller 102, such as the embodiment depicted in FIG. 1A-1B, but further comprises a pairing database 107. The second object 220 is paired with the third object 330 and the fourth object 440 for securing the second object 220. Hence, such a pairing indicates that the second object 220 and the third object 330 and fourth object 440 belong together. The first object 100 comprises a detector 101. The detector 101 detects a second signal 221 of the second object 220 and a third signal 331 of the third object 330 and a fourth signal 441 of the fourth object 440, when transmitted within a detection area 103, 1031 of the detector 101. The detector further provides a detector output 104.

The detection area 103 is adjustable in size. The detector 101 provides a default detection area 103, which is e.g. the physical largest possible detection area. However, the detector 101 may also adjust the detection area 103 to a smaller detection area. This is advantageous because the theft detection may be tailored to a specific area, and the tolerance for theft detection will be smaller. Referring to the embodiment depicted in FIG. 3, the physical largest possible detection area 103 therefore comprises a plurality of detection areas 1031, 1032, 1033, 1034, 1035, 1036; for example read here as subareas. The detection area 103 of the first object 100 for theft detection of the second object 220 is now the smaller detection area 1031. Thus, the condition for performing a theft detection is tailored to the area 1031, instead of the larger default detection area 103. In such a way, the theft detection may be advantageously performed earlier for a smaller detection area whenever theft occurs. Here, the smaller detection area 1031 is implemented by an instruction signal 1037 send by the third object 330 to the first object 100; in particular to the controller 102. The first object is able to receive the desired size of the detection area with such an instruction signal 1037. Such a preference determines the resolution of the theft detection. Alternatively, the first object, or in particular the detector of the first object, may autonomously change the size of the detection area 103. For example by identifying the size of objects autonomously and adjusting the detection area 103 thereon.

In the embodiment depicted in FIG. 3, the second object 200 is a bicycle, the third object 330 is a smartphone, and the fourth object 440 is a smartwatch. All three objects belong together. For example, a person owning the smartphone (third object 330) owns the bicycle (second object 220) and transports a friend carrying a smartwatch (fourth object 440) on the back of said bicycle. The person and the friend are thus travelling together on the bicycle. Arrived at a city square to park the bicycle, theft detection is desired. To ensure the detection area is tailored to only the bicycle parking area, the person owning the smartphone instructs the first object to implement a smaller detection area (only covering the bicycle park area) for theft detection. Alternatively, the detection area may be set to a smaller detection area corresponding to the smallest detection area reliably detectable by the detector with respect to signal strength.

In alternative embodiments (not depicted), the second object may be another vehicle such as a car, boat, motorcycle or drone; the second object may alternatively further be an electronics device such as a smartphone, wearable device, smartwatch, smart clothing, fitness tracker or glass, a notebook, a tablet, a toy, a household device, a television, a smart light bulb, a game console, a computer, or a tool; yet further the second object may alternatively be jewelry, expensive clothing items, artwork, a person, a pen, or household equipment. Furthermore, the third object and fourth object may alternatively be a key device, a smartphone, another wearable or a personal electronics device with a transmitter.

Referring to the embodiment depicted in FIG. 3, the first object 100 is part of a lighting infrastructure, more specifically part of a smart outdoor lighting infrastructure, such as a set of luminaires. The first object 100 comprises additional communication technologies to communicate with other objects. The detector 101 of the first object 100 has an orientation to the detection area 103, such that the second signal 201 and the third signal 301 are well receivable. The detector 101 comprises a plurality of detectors 111, 112, of which both detectors 111,112 are comprised by the first object 100, but are located separately (schematically depicted). The first detector of the plurality 111 is located at a first outdoor luminaire, the second detector of the plurality 112 is located at a second outdoor luminaire. The detection area of each of the detectors of the plurality 111,112 provides the physically largest possible detection area 103. Therefore, the coverage area of the detector 101 is larger and theft detection may be performed on a larger scale. Furthermore, as the first detector 111 (of the plurality) is located differently from the second detector 112 (of the plurality), the detection area 103 is covered from different angles and positions, and hence a more effective detection may be provided. For example, in case an indicative signal such as a QR code needs to be recognized, a detector comprising at least two cameras may best be placed under different angels in an area to enable more view angles to effectively capture the QR code. Or for example, in case a wireless signal may be transmitted from an object within a crowded environment, it may be more effective to place a plurality of receivers at different angles with respect to the crowded environment, such that any blockage of the signal to one receiver may be compensated by another.

Still referring to the embodiment depicted in FIG. 3, the detector 101, 111, 112 detects the second signal 221 of the second object 220 and the third signal 331 of the third object 330, and the fourth signal 441 of the fourth object 440.

The second signal 221 is an indicative signal dedicated for theft detection. The second signal 221 may be a QR code on the surface of the bicycle (the second object 220). The QR code may be on a fixed print or on an e-ink like display. The QR code provides a unique representation of the bicycle. The detector 101 comprises a camera to detect the QR code. The third signal 331 is a Wi-Fi signal transmitted as regular Wi-Fi traffic of the smartphone (the third object 330). The third signal 331 is identifiable as a unique signal belonging to the smartphone. The fourth object 440 (the smartwatch) emits a fourth signal 441 which is a Bluetooth signal. The detector 101 detects said signal for theft detection. Both the fourth signal 441 and third signal 331 are not initially dedicated for theft detection, but belong to the regular signaling traffic of the object, however, in alternative embodiments, said signals may be dedicated signals for the purpose of theft detection, for example encrypted unique representations of the object. Thus, in this embodiment, the detector 101 at least comprises a camera, a Wi-Fi receiver and a Bluetooth receiver. If the bicycle is identified in another manner than with a QR code, the camera may be omitted. The detector output 104 comprises signaling data of the second signal 221 (image), the third signal 331 (Wi-Fi), and the fourth signal 441 (Bluetooth) within the detection area 1031, and the physically largest possible detection area 103. The second detector 112 of the plurality of detectors of the detector 101 provides its detector output by a wireless connection. Alternatively, by a wired connection or other means of communication.

Still referring to the embodiment depicted in FIG. 3, as partly mentioned before, the controller 102 is arranged for processing the detector output 104. Based on the detector output 104, the controller 102 identifies a condition 105 indicating (i) a pairing of the second signal 221, the third signal 331, and the fourth signal 441; and (ii) the second signal 221 moving out of the detection area 1031 while at least the third signal 331 or fourth signal 441 is not being detected within the detection area 1031. Such a condition 105 indicates a theft detection. The controller 102 further performs a theft detection action 106 when the condition 105 is identified.

The pairing of the second signal 221, third signal 331 and the fourth signal 441 may be identified by the controller by accessing a pairing database 107. Such a pairing database 107 comprises a list indicating whether the second signal 221, third signal and the fourth signal 441 are a pair. That is: indicating whether these signals (representing objects) belong together. Here, the pairing database 107 comprises a value in the list indicating that the second signal 221 of the second object 220 and either the third signal 331 of the third object 330 or the fourth signal 441 of the fourth object 440, or all three signals of all three objects, belong together. The list provides an allowable combination.

Such a value (or registration) is present within the pairing database 107 because it is provided by the third object 330. Alternatively, the values forming a list of allowable pairs within the pairing database is initially given or provided by another object or entity. The pairing database 107 is arranged for receiving updates. The pairing database 107 is namely accessible by authorized objects, which may perform actions with respect to the pairing database 107. Such an update may comprise the registration of new pairing data, or the deletion of current pairing data, or amendments to current pairing data. Hence, the pairing database 107 may be arranged for receiving an input signal for amending a database value. Thus, still referring to the embodiment depicted in FIG. 3, the pairing database 107 is accessed by the third object 330 by means of an internet connection, for example Wi-Fi. The third object 330 sends an input signal 108 for amending a database value of the pairing database 107. After reception of said input signal 108 by the pairing database 107, the list comprised within the pairing database 107 is updated, such that: the pairing database 107 comprises a value in the list indicating that the second signal 221 of the second object 220 and the third signal 331 of the third object 330 and the fourth signal 441 of the fourth object 440 belong together and are listed as a pair. Here, accessing the pairing database 107 by the third object 330 to update a value is free of charge, however, in alternative embodiments, such an activity may be charged as a service.

The controller 102 is arranged for accessing the pairing database 107 and retrieving said information on said pairing. The pairing database 107 is hosted locally within the first object 100. Alternatively, the pairing database 107 may be hosted within an external server, or a separate accessible storage device, or may be accessible by the internet, or may be hosted within an object within the detection area. The controller 102 is further a processor, which is able to analyze and process the detector output 104. The controller 102 may provide image recognition technologies, such the indicative QR signal (the second signal 221) may be processed.

Still referring to the embodiment depicted in FIG. 3, the theft detection action 106 is an alarm signal provided by the controller 102 comprising instructions to send a notification message to the third object 330 (smartphone) and the fourth object 440 (the smartwatch), which are registered in the pairing database 107. Alternatively, the theft detection action 106 may comprise a visual alarm, audible alarm, sending notification messages to e.g. official institutions, other objects, objects in the vicinity of first objects such as the present invention, etc. Alternatively, the theft detection action 106 may comprise monitoring activities, such as keeping track of the detection area 103, 1031; or taking images, or recording the signal history within the detection area 103.

Thus, in brief summary, said bicycle, smartphone and smartwatch are registered as a pair in the pairing database by means of an input signal provided by the smartphone. The smartphone also indicates to the first object that the detection area may be smaller by means of an input signal. Hence the resolution for theft detection is more tailored to a specific area. The detector is able to detect the QR code on the bicycle by means of its camera, and detect the Wi-Fi and Bluetooth signals of the smartphone and smartwatch by means of Wi-Fi receiver and Bluetooth receiver. When the bicycle leaves the smaller detection area, without the presence of the smartwatch or the smartphone, a theft is detected and a theft detection action is provided. Said theft detection action is sending a notification message to the smartphone and smartwatch.

Figure 4:
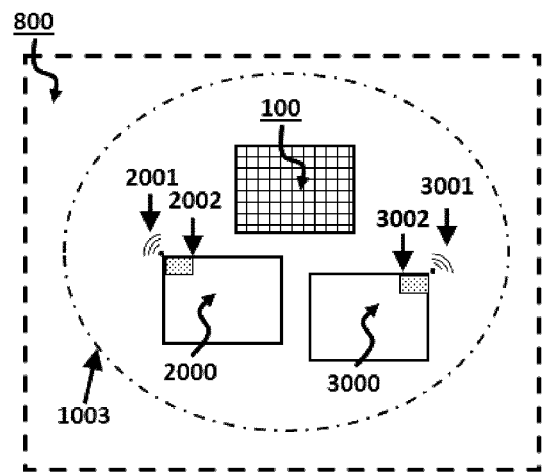
FIG. 4 depicts schematically an embodiment of a system for theft detection of a second object, the second object being in pair with a third object for securing the second object, the system comprising a first object according to the first aspect of the invention, a second object and a third object.

FIG. 4 depicts schematically an embodiment of a system 800 for theft detection, which is able to detect theft of a second object 2000, which is in pair with a third object 3000 for securing the second object 2000. The system 800 comprises a first object 100, according to an embodiment of the first aspect of the invention. The second object 2000 is paired with the third object 3000 for securing the second object 2000. The second object 2000 comprises a second beacon 2002 for sending a second signal 2001. The third object 3000 comprises a third beacon 3002 for sending a third signal 3001. Such a system may provide theft detection for a second object 2000 pair-able with a third object 3000 by means of the first object 100, as explained in embodiments describing a first object 100 according to the invention.

The first object 100 comprises a detector and a controller. The detector detects the second signal 2001 of the second object 2000 and a third signal 3001 of the third object 3000 when transmitted within a detection area 1003 of the detector. The detector further provides a detector output 104. The controller is arranged for processing the detector output. Based on the detector output, the controller identifies a condition indicating (i) a pairing of the second signal 2001 and the third signal 3001, and (ii) the second signal 2001 moving out of the detection area 1003 while the third signal 3001 is not being detected within the detection area 1003. The controller further performs a theft detection action when the condition is identified.

Referring to the embodiment depicted in FIG. 4, the first object 100 of the system 800 identifies a pairing of the second signal 2001 and the third signal 3001, when the second signal 2001 and the third signal 3001 are moving in pair into the detection area 1003. Alternatively, in other embodiments (not depicted), said pairing within the system 800 may be identified: by observing other relations between the second object 2000 and the third object 3000 within the detection area 1003; by receiving an input signal provided by the third object 3000 to indicate that the third signal 3001 of the third object 3000 and a second signal 2001 of a second object 2000 are a pair; by accessing a pairing database comprising a list indicating whether the second signal 2001 and the third signal 3001 are a pair; by observing indicative signals indicating a pairing between the second object 2000 and the third object 3000; by receiving a registration of a monetary transaction for theft detection from an external server, wherein a pairing is provided which is associated with the monetary transaction (thus 'paying for pairing'). In the alternative examples given above, the pairing database may also be comprised within the system 800. Thus, in an embodiment (not depicted), the system depicted in FIG. 4, further comprises a pairing database comprising a list indicating whether the second signal and the third signal are a pair. This list is adjustable by an external input, such that a pairing may be provided by the third object or another object. Furthermore, the external server providing a registration of a monetary transaction for theft detection may moreover be comprised within the system 800.

Still referring to the embodiment of a system for theft detection depicted in FIG. 4, the first object 100 is part of an outdoor lighting fixture. The first object 100 receives the second signal 2001 of the second object 2000 and the third signal 3001 of the third object 3000, such that it may provide theft detection. Alternatively, the first object may be part of another lighting fixture, element of a lighting infrastructure or an indoor lighting fixture. Such an indoor lighting fixture may be a ceiling luminaire within a lecture room wherein students leave electronic devices and spend time away from said devices. Hence requiring theft detection.

The second object 2000 is a car, with a Wi-Fi beacon 2002, emitting a Wi-Fi signal 2001. The third object 3000 is a smartwatch, with a Bluetooth transmitter 3002, emitting a Bluetooth signal 3001. Alternatively, the second object may be a bicycle, automobile, boat, motorcycle, airplane, or drone. An electronics device may for example be a smartphone, a wearable device such as a smartwatch, smart clothing, fitness tracker or glass, a notebook, a tablet, a toy, a drone, a household device, a television, a smart light bulb, a game console, a computer, or a tool. Alternatively, the third object may for example be a device from the group of an electronics device, a vehicle, a toy, a key device, a passive key, or a wearable device.

The second beacon 2002 emitting the second signal 2001 and the third beacon 3002 emitting the third signal 3001 may alternatively be an antenna, chip or an electronic sending device. Such a beacon may enable communication by means of Wi-Fi, ZigBee, LoRa, Bluetooth, Radio Frequency (RF), Infrared (IR), Visible Light Communication (VLC), audio.

Still referring to the embodiment depicted in FIG. 4, the theft detection action comprises sending a notification message to the third object 3000. The first object 100 performs this action by providing a theft detection action signal to an external communicating server, the server assesses the received signal and follows the instruction to send a message to the third object 3000. The theft detection action thus comprises initiating a notification message. Alternatively, a message may be sent to governmental institutions, to other objects detected in the detection area of the first object during theft, to other objects identified by other similar first objects, to objects identified with other means present in the vicinity of the first object but outside the detection area, to a storage device recording instances of theft, to a wearable device of the registered owner of the second object, to a device of a thief being detected comprising a message to abort the theft. Furthermore, the theft detection action comprises the monitoring of the detection area 1003 during and after theft detection. A camera in the first object 100 makes a recording of the theft detection area during and after theft is being detected. The first object 100 also sends a signal to other similar first objects (the theft detection action) in the vicinity to make a recording. This may facilitate the gathering of evidence. Alternatively, in case a recording medium was already active during the moment of theft, the theft detection action may comprise collecting such image data from said recording medium. Yet alternatively, the first object may perform a theft detection action wherein all signals within the detection area are collected and temporarily stored. The theft detection action further provides a visible alarm signal in the form of modulated lighting intensity. As the first object 100 is part of an outdoor lighting fixture, the lighting fixture provides a modulated intensity of light, preferably as a light beam, preferably at the location where the second object 2000 is detected to have left the detection area 1003. Alternatively, an audible alarm may be performed. Alternatively, the lighting fixture may also be instructed to perform other theft detection actions.

Alternatively, in an embodiment (not depicted), a system for theft detection is provided, which is partly similar to the embodiment in FIG. 4, but the system now comprises N additional first objects, which are similar to the first object; wherein N is an integer larger than 2. Said system for theft detection operates synchronized, such that the theft detection action may be performed over more first objects, namely N first objects.

In an embodiment (not depicted), a system for theft detection is provided, which is partly similar to the embodiment in FIG. 4, but now the first object is part of a drone; and the second object and the third object are respectively a car and a smartphone.

In an embodiment (not depicted), a system for theft detection is provided, which is partly similar to the embodiment in FIG. 4, but now the first object is part of an indoor lighting fixture; and the second object and the third object are respectively an electronics device and a wearable device.

In an embodiment (not depicted), a system for theft detection is provided, which is partly similar to the embodiment in FIG. 4, but now the first object is part of an autonomous device for theft detection; and the second object and the third object are respectively a vehicle and a key device.

In an embodiment (not depicted), a system for theft detection is provided, which is partly similar to the embodiment in FIG. 4, but now the first object is part of an indoor lighting fixture; and the second object and the third object are respectively an electronics device and a wearable device.

In an embodiment (not depicted), a system for theft detection is provided, which is partly similar to the embodiment in FIG. 4, but additionally comprising a further device. The further device receives a theft detection action signal from the first object and performs a theft detection action. Here, the further device is a further smart lighting fixture other than the lighting fixture the first object is part of. The further smart lighting fixture receives a theft detection action signal from the first object, when theft is detected, and performs a further theft detection action. Said further theft detection action is: providing illumination when the second signal of the second object is detected by the further smart lighting fixture, and storing all monitored data after the moment of theft detection, which is being recorded by the further smart lighting fixture (such as image data and signaling data). In this way, the second object may be tracked by the further device.

Figure 5:
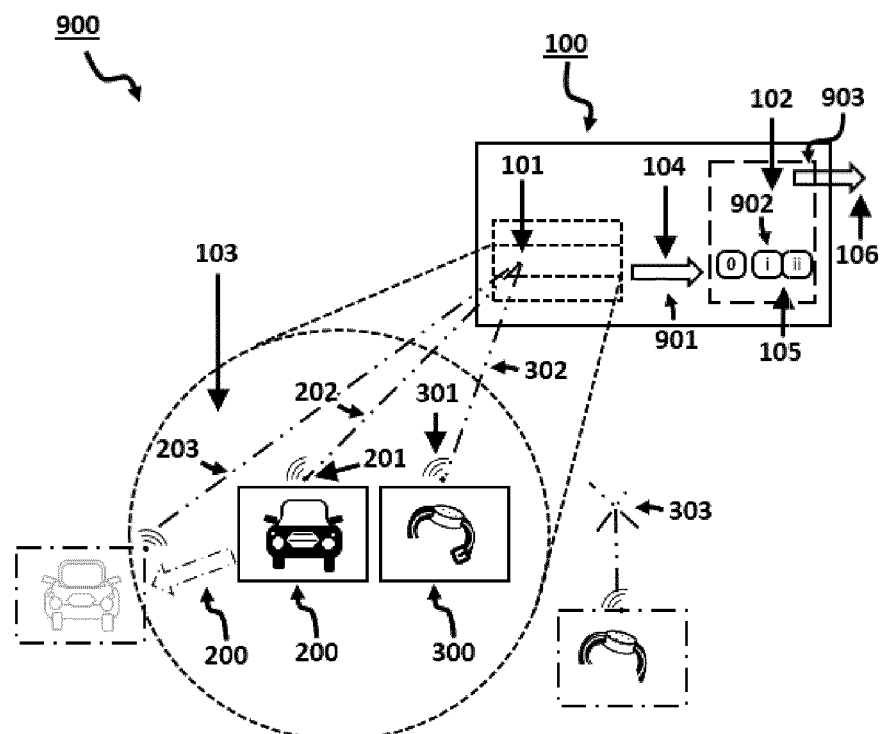
FIG. 5 depicts schematically an embodiment of a method performed by a first object for theft detection of a second object, the second object being in pair with a third object for securing the second object.
Figure 6:
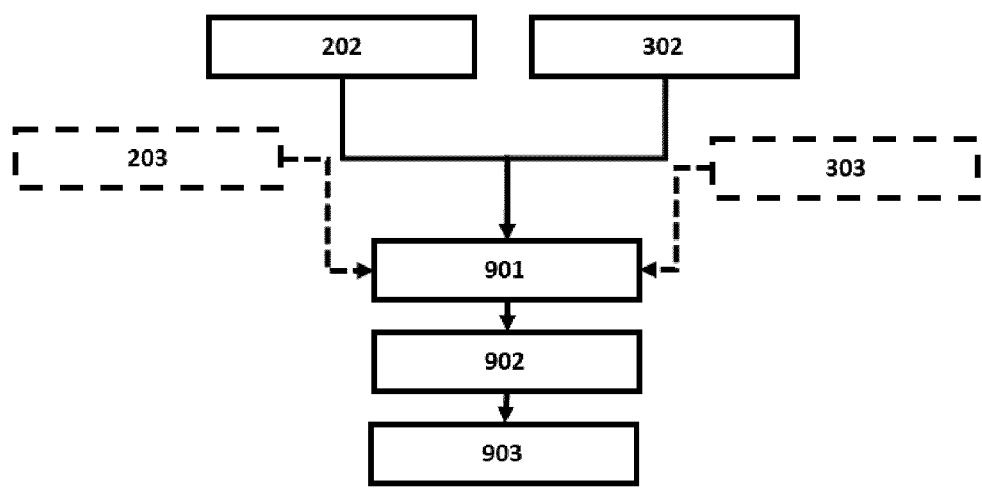
FIG. 6 depicts schematically a flowchart thereof.

FIG. 5 depicts schematically, by non-limiting example, an embodiment of a method 900 performed by a first object 100 for theft detection of a second object 200, the second object 200 being in pair with a third object 300 for securing the second object 200. FIG. 6 depicts schematically a flowchart thereof. The method comprises multiple steps. A detector 101 comprised within the first object 100 detects 202 a second signal 201 of the second object 200 and detects 302 a third signal 301 of the third object 300, both transmitted within a detection area 103 of the detector 101. The detector 101 subsequently provides 901 a detector output 104 to a controller 102. The controller 102, by processing the detector output 104, identifies 902 a condition 105 indicating both (i) a pairing of the second signal 201 and the third signal 301, and (ii) the second signal moving out 203 of the detection area 103 while the third signal is not being detected 303 within the detection area 103. The controller performs 903 a theft detection action 106 when the condition 105 is identified. Such a theft detection method is advantageous, as also mentioned before for the first aspect of the invention, because it provides an autonomous and unobtrusive method for theft detection of two objects being in pair (hence belonging together).

Referring to the embodiment depicted in FIG. 5 and FIG. 6, the second objects 200 is a vehicle, namely an automobile. The second object 200 emits a Wi-Fi signal. The third object 300 is a key device, namely a smartwatch. Alternatively, the third object 300 is a digital smart car key. The third object 300 emits a Bluetooth signal. The smartwatch is paired with the automobile (the second object 200) for securing the automobile and providing theft detection by means of the method 900 performed by the first object 100. The first object is part of a lighting infrastructure, namely a part of a smart outdoor luminaire on a light pole.

In an alternative embodiment (not depicted), a method for theft detection is provided, which is partly similar to the embodiment depicted in in FIG. 5 and FIG. 6, but the method further comprises a step, wherein the controller accesses a pairing database comprising a list indicating whether the second signal and the third signal are a pair. The controller subsequently identifies a pairing of the second signal and the third signal, when in the pairing database the second signal and the third signal are listed as a pair.

The invention claimed is:

1. A first object for theft detection of a second object, the second object being in pair with a third object for securing the second object, the first object comprising:
   a detector for
   detecting a second signal from the second object and a third signal from the third object when transmitted within a detection area of the detector, and
   providing a detector output;
   a controller for
   identifying, by processing the detector output, a condition indicating both (i) a pairing of the second signal and the third signal, and (ii) the controller determining, from tracking a location of the second signal, that the second signal is leaving the detection area and that the third signal is not being detected within the detection area while the second signal is leaving the detection area, and performing a theft detection action for protecting against theft of the second object in response to said identifying.

2. The first object according to claim 1, wherein the controller is arranged for
identifying a pairing of the second signal and the third signal, when the second signal and the third signal are moving in pair into the detection area.

3. The first object according to claim 1, wherein the controller is arranged for
accessing a pairing database comprising a list indicating whether the second signal and the third signal are a pair, and
identifying a pairing of the second signal and the third signal, when in the pairing database the second signal and the third signal are listed as a pair.

4. The first object according to claim 3, further comprising a storage device for hosting the pairing database locally within the first object.

5. A system for theft detection comprising:
a first object comprising a detector and a controller;
a second object; and
a third object,
wherein the second object is in pair with the third object for securing the second object,
wherein the detector is configured to
detect a second signal from the second object and a third signal from the third object when transmitted within a detection area of the detector, and
provide a detector output, and
wherein the controller is configured to
perform an identification, by processing the detector output, of a condition indicating both (i) a pairing of the second signal and the third signal, and (ii) the controller determining, from tracking a location of the second signal, that the second signal is leaving the detection area and that the third signal is not being detected within the detection area while the second signal is leaving the detection area, and
perform a theft detection action for protecting against theft of the second object in response to said identification.

6. The system according to claim 5, wherein the first object is part of a lighting infrastructure.

7. The system according to claim 5, wherein the third object is a key device, smartphone or smart wearable device.

8. The system according to claim 5, wherein the second object is a vehicle or electronics device.

9. The system according to claim 5, the system further comprising
a pairing database comprising a list indicating whether the second signal and the third signal are a pair;
wherein the list is adjustable by an external input.

10. The system according to claim 5, wherein the theft detection action comprises an action from the group of monitoring, sending a notification, outputting a visual alarm, outputting an audible alarm;
wherein the warning notification is sent to governmental institutions, security companies, a registered owner of the second object, the third object, or receivers further detected within the detection area during time of theft.

11. The system according to claim 5, wherein the theft detection action comprises taking an image of the detection area or tracking the second signal.

12. A method performed by a first object for theft detection of a second object, the second object being in pair with a third object for securing the second object, the method comprising:
detecting, with a detector comprised within the first object and within a detection area of the detector, a second signal from the second object and a third signal from the third object;
providing a detector output of the detector to a controller;
identifying, with the controller, by processing the detector output, a condition indicating both (i) a pairing of the second signal and the third signal, and (ii) the controller determining, from tracking a location of the second signal, that the the second signal is leaving the detection area and that the third signal is not being detected within the detection area while the second signal is leaving the detection area;
performing a theft detection action for protecting against theft of the second object in response to said identifying.

13. A method according to claim 12, wherein the method further comprises:
identifying, with the controller, a pairing of the second signal and the third signal, when the second signal and the third signal are moving in pair into the detection area.

14. A method according to claim 12, wherein the method further comprises:
accessing, with the controller, a pairing database comprising a list indicating whether the second signal and the third signal are a pair, and
identifying, with the controller, a pairing of the second signal and the third signal, when in the pairing database the second signal and the third signal are listed as a pair.

15. A computer program product comprising computer program code stored on a non-transitory storage medium, wherein the program code is configured to cause a processor to perform the method of claim 12 when the computer program code is run by the processor.

* * * * *